(12) United States Patent
Darcy, III et al.

(10) Patent No.: US 7,491,281 B2
(45) Date of Patent: Feb. 17, 2009

(54) BELT AND METHOD OF MAKING SAME

(75) Inventors: John J. Darcy, III, Webster, NY (US);
Michael S. Roetker, Webster, NY (US);
David W. Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 315 days.

(21) Appl. No.: 11/391,024

(22) Filed: Mar. 28, 2006

(65) Prior Publication Data

US 2007/0107833 A1    May 17, 2007

Related U.S. Application Data

(63) Continuation-in-part of application No. 11/273,211, filed on Nov. 14, 2005.

(51) Int. Cl.
*B32B 37/00* (2006.01)
(52) U.S. Cl. .................. 156/73.3; 156/73.1; 156/73.4; 156/157
(58) Field of Classification Search ............... 156/73.1, 156/73.3, 73.4, 157, 159, 304.1, 304.6, 580.1, 156/580.2, 137, 229
See application file for complete search history.

(56) References Cited

U.S. PATENT DOCUMENTS

| | | | | |
|---|---|---|---|---|
| 3,419,447 A | 12/1968 | Hewitt | ...................... | 156/73.3 |
| 3,799,859 A | 3/1974 | Wallin | ...................... | 204/216 |
| 3,939,033 A | 2/1976 | Grgach | ...................... | 156/515 |
| 3,988,399 A | 10/1976 | Evans | ...................... | 264/22 |
| 4,120,931 A | 10/1978 | Fukushima et al. | ...................... | 264/288 |
| 4,532,166 A | 7/1985 | Thomsen | ...................... | 428/57 |
| 4,838,964 A | 6/1989 | Thomsen et al. | ...................... | 156/73.1 |
| 4,878,985 A | 11/1989 | Thomsen et al. | ...................... | 156/459 |
| 4,959,109 A | 9/1990 | Swain et al. | ...................... | 156/73.4 |
| 4,968,369 A | 11/1990 | Darcy et al. | ...................... | 156/217 |
| 5,085,719 A | 2/1992 | Eck | ...................... | 156/73.4 |
| 5,207,854 A * | 5/1993 | Becking | ...................... | 156/350 |
| 5,240,532 A | 8/1993 | Yu | ...................... | 156/137 |
| 5,310,443 A * | 5/1994 | Burger | ...................... | 156/466 |
| 5,549,999 A | 8/1996 | Swain et al. | ...................... | 430/127 |
| 5,693,372 A | 12/1997 | Mistrater | ...................... | 427/430.1 |
| 6,068,722 A | 5/2000 | Yu et al. | ...................... | 156/137 |
| 6,074,504 A * | 6/2000 | Yu et al. | ...................... | 156/137 |
| 6,157,038 A | 12/2000 | Swain et al. | ...................... | 250/459.1 |
| 6,165,670 A | 12/2000 | Yu et al. | ...................... | 430/130 |

(Continued)

*Primary Examiner*—James Sells
(74) *Attorney, Agent, or Firm*—Alix, Yale & Ristas, LLP

(57) ABSTRACT

A method is disclosed that involves providing a sheet of thermoplastic belt material having a first end with a first radius of curvature, providing a mandrel having a second radius of curvature that is no more than 12% larger or smaller than the first radius of curvature, wrapping the sheet of thermoplastic belt material on the mandrel to form a material overlap region, and welding the material overlap region to form a seamed belt. In one embodiment, instead of cutting the belt to length, the material is then continued to be wrapped around the mandrel, forming a belt material overlap, and held under tension. As the ultrasonic welding horn is traversed across the width of the belt overlap, the horn not only joins the belt material wrapped around the mandrel but, as the trailing edge is held under tension, the horn also separates or severs the trailing edge of the material from the welded seam. A seamed belt is also disclosed.

28 Claims, 10 Drawing Sheets

U.S. PATENT DOCUMENTS

| | | | |
|---|---|---|---|
| 6,173,152 B1 | 1/2001 | Schlueter, Jr. et al. | 399/328 |
| 6,217,686 B1 * | 4/2001 | Kelley et al. | 156/73.1 |
| 6,263,183 B1 | 7/2001 | Schlueter, Jr. et al. | 399/329 |
| 6,277,534 B1 | 8/2001 | Foltz et al. | 430/56 |
| 6,442,365 B1 | 8/2002 | Schlueter, Jr. et al. | 399/328 |
| 6,733,943 B2 | 5/2004 | Finn et al. | 430/124 |
| 6,740,182 B2 * | 5/2004 | Yu | 156/73.4 |
| 6,815,131 B2 | 11/2004 | Darcy, III | 430/56 |
| 6,848,978 B2 | 2/2005 | Mastro et al. | 451/51 |
| 6,927,006 B2 | 8/2005 | Finn et al. | 430/124 |
| 2003/0068445 A1 | 4/2003 | Bellino et al. | 427/430.1 |
| 2004/0173943 A1 | 9/2004 | Yu et al. | 264/493 |
| 2005/0133965 A1 | 6/2005 | Yu et al. | 264/481 |
| 2005/0279448 A1 | 12/2005 | Darcy, III et al. | 156/272.8 |
| 2006/0002746 A1 | 1/2006 | Darcy, III et al. | 399/302 |

* cited by examiner

BELT AND METHOD OF MAKING SAME

RELATED APPLICATIONS

This is a continuation-in-part of U.S. application Ser. No. 11/273,211 filed Nov. 14, 2005.

INCORPORATION BY REFERENCE OF OTHER U.S. PATENTS

The disclosures of the following sixteen U.S. Patent Documents hereby are incorporated by reference, verbatim, and with the same effect as though the same disclosures were fully and completely set forth herein:

U.S. Pat. No. 3,419,447, "Method and apparatus for bonding together two thermoplastic sheets by ultrasonic energy", issued 31 Dec. 1968 to Eugene E. Hewitt ("Hewitt");

U.S. Pat. No. 3,799,859, "Electroforming system", issued 26 Mar. 1974 to Edwin M. Wallin ("Wallin"), assigned to Xerox Corporation;

U.S. Pat. No. 3,939,033, "Ultrasonic welding and cutting apparatus", issued 17 Feb. 1976 to Frank J. Grgach et al. ("Grgach");

U.S. Pat. No. 4,532,166, "Welding of web materials", issued 30 Jul. 1985 to Karl V. Thomsen et al. ("Thomsen"), assigned to Xerox Corporation;

U.S. Pat. No. 4,878,985, "Apparatus for preparing belts", issued 7 Nov. 1989 to Karl V. Thomsen et al. ("Thomsen"), assigned to Xerox Corporation;

U.S. Pat. No. 4,959,109, "Apparatus and process for preparing belts", issued 25 Sep. 1990 to Eugene A. Swain et al. ("Swain"), assigned to Xerox Corporation;

U.S. Pat. No. 5,085,719, "Variable rate welding of thermoplastic belts", issued 4 Feb. 1992 to David A. Eck ("Eck"), assigned to Xerox Corporation;

U.S. Pat. No. 5,240,532, "Process for heat treating a flexible electrostatographic imaging member", issued to Robert C. U. Yu et al on Aug. 31, 1993, assigned to Xerox corporation;

U.S. Pat. No. 5,693,372, "Immersion coating process", issued 2 Dec. 1997 to Alan B. Mistrater et al. ("Mistrater"), assigned to Xerox Corporation;

U.S. Pat. No. 6,068,722, "Seam stress release in flexible electrostatographic imaging belts", issued May 30, 2000 to Robert C. U. Yu et al., assigned to Xerox Corporation;

U.S. Pat. No. 6,165,670, "Method of treating electrostatographic imaging web and method of making electrostatographic imaging members using such imaging web", issued Dec. 26, 2000 to Robert C. U. Yu at al., assigned to Xerox Corporation;

U.S. Pat. No. 6,733,943, "Pressure layer having polyimide outer layer", issued May 11, 2004 to Finn et al., assigned to Xerox Corporation;

U.S. Pat. No. 6,815,131 B2, "Method for making an imaging belt", issued 9 Nov. 2004 to John Joseph Darcy, III ("Darcy, III"), the same individual as one of the present applicants, the patent being assigned to Xerox Corporation;

U.S. Pat. No. 6,848,978 B2, "Method of finishing a belt seam using an abrasive finishing machine, a method of finishing a belt seam using an abrasive finishing machine having a plurality of finishing heads, and a method of finishing a belt seam using an abrasive finishing machine having first, second, third and fourth finishing heads", issued 1 Feb. 2005 to Paul F. Mastro et al. ("Mastro"), assigned to Xerox Corporation;

U.S. Pat. No. 6,927,006, "Fuser member having fluorocarbon outer layer", issued Aug. 9, 2005 to Patrick Finn et al., assigned to Xerox Corporation; and U.S. patent application Publication No. 2006/0002746 A1, "Welded polyimide intermediate transfer belt and process for making the belt", assigned to Xerox Corporation.

BACKGROUND

Ultrasonic bonding or welding is known. For example, in the aforementioned U.S. Pat. No. 3,419,447 to Hewitt there is described a method and apparatus for bonding thermoplastic sheets to one another wherein adjacent marginal regions of the sheets are overlapped to form an area of double thickness and this overlapping area is then passed between a pair of ultrasonically vibrating tools. The tools compress and heat an intermediate portion of the overlapping area and are constructed and arranged to concurrently (1) transpose the sheets into a common plane, (2) bond the sheets to one another in the intermediate portion, and (3) cut off a pair of unbonded edge portions of the marginal regions at the opposite sides of the bonded portions thereof and at the opposite faces of the sheets, respectively.

Also, in the aforementioned U.S. Pat. No. 3,939,033 to Grgach, there is described an ultrasonic welding and cutting apparatus using an ultrasonically vibrating horn and an anvil means.

Also, in the aforementioned U.S. Pat. No. 4,532,166 to Thomsen there is depicted in FIGS. 1-2 and described in col. 2, lines 22-59 an ultrasonic welding apparatus including an ultrasonic horn 12 vibrating along a vertical axis 14. The edge 16 of a thermoplastic web 18 is supported by the upper surface of an included anvil 10 and the edge 20 of the web 22 is positioned so that the edge 20 of the web 22 overlaps the edge 16 of the web 18. Edge 20 of web 22 contains plural apertures 24. The high vibration frequency of the horn 12 causes the temperature of at least the contiguous overlapping surfaces of the thermoplastic web 18 and web 22 to increase until at least the thermoplastic material in web 18 flows and fill apertures 24. A sectional view of the resulting bonded joint or seam is shown in FIG. 3.

Also, in the aforementioned U.S. Pat. No. 4,878,985 to Thomsen there is described a process and apparatus for fabricating belts utilizing ultrasonic welding. For example, an ultrasonic belt welding station 12 comprising an ultrasonic horn and transducer assembly 300 is described in connection with FIGS. 1, 11, 12 and 13; especially see the written description from col. 14, line 43 to col. 17, line 5.

Also, in the aforementioned U.S. Pat. No. 6,815,131 B2 to Darcy, III, there is described a process of forming a flexible belt utilizing an ultrasonic welding system 70. The ultrasonic welding system 70 is depicted in FIG. 4. As depicted in FIGS. 4-7 and described in the written description at col. 4, lines 18-40, there is provided a flexible belt member 105 having a first end 110 and a second end 120. The first end 110 overlaps the second end 120 and forms an overlap region. In turn, the first and second ends 110 and 120 are ultrasonically welded at one or more locations along the overlap region, thus forming a finished belt. One example of a finished belt 100 is shown in FIG. 8.

Using mandrels in forming endless belts is known. In the aforementioned U.S. Pat. No. 3,799,859 to Wallin, for example, there is described a method and apparatus for forming a relatively thin, flexible endless belt on a support mandrel. After the endless belt is formed, the belt is removed from the mandrel.

Also, in the aforementioned U.S. Pat. No. 5,693,372 to Mistrater, there is described a process for dip coating a drum substrate 23. As depicted in FIG. 2 and described in the written description from col. 6, line 40 to col. 7, line 5, the drum substrate 23 is suspended from a mandrel 25 which grips the interior surface of the drum substrate 23.

Using vacuum apertures to secure or hold a belt material during ultrasonic welding is known. In the aforementioned U.S. Pat. No. 4,959,109 to Swain, for example, col. 3, lines 37-60 describe using a vacuum slot 29 to hold a free end of web 6 at a wrapping station 2. The vacuum slot 29 may alternately comprise one or more rows of holes of any suitable shape.

Further, Swain's written description from col. 4, line 59 to col. 5, line 7 describes a vacuum pick up arm 50 including a vacuum chamber 56 coupled to vacuum slots 59, 60 and 61. If desired, additional rows of slots or other suitably shaped apertures may be substituted for vacuum slots 59, 60 and 61.

Further, Swain discloses parallel rows of ports 90, 91 and 92 positioned axially along the outer periphery of mandrel 80. These ports 90, 91 and 92 are connected through airways 93, 94 and 96 that extend from the ports 90, 91 and 92 through shaft 82 to circumferential channels 98, 100 and 102 which, in turn, are connected through corresponding air lines through a journal box 84 to a cluster of electrically activateable valves and switches 105. Positive pressure, a vacuum or ambient air pressure may be supplied to the journal box 84 from any suitable conventional source, Swain, col. 6, lines 14-46.

Although Swain's mandrel 80 is illustrated as a cylinder having a circular cross section, the cross section may be of any other suitable shape. Also, the location of the web seam 138 on the mandrel is preferably positioned parallel to the axis of the mandrel along an imaginary line or band on the outer periphery of the cylinder defined by the greatest radius of the cylinder, Swain, col. 6, lines 55-64.

Further, Swain's web 6 is placed over parallel rows of ports 90 and a vacuum is supplied to the parallel rows of ports 90 to secure the web 6 to the mandrel 80, Swain, col. 7, lines 65-68.

As Swain's mandrel 80 nears the end of its rotation cycle, a vacuum is supplied to parallel rows of ports 92 which anchors the adjacent region of web 6 to mandrel 80 to ensure that web 6 remains tightly wrapped under tension on the mandrel 80 even after a subsequent web cutting operation, Swain, col. 8, lines 17-22.

When Swain's mandrel 80 completes its rotation cycle of 360 degrees, a vacuum is supplied to secure web 6 to support platform 28; pneumatic cylinder 78 is activated to extend disk knife 79 through web 6 and against edge 26; and electric motor 72 is started to rotate lead screw 71 to reciprocate carriage 77 and disk knife 79 across the width of web 6 thereby severing web 6, col. 8, lines 22-29. Upon completion of shearing, a vacuum is supplied to the ports 91 to suck and tack the freshly severed trailing end of web 6 against mandrel 80, the freshly severed trailing end of the web 6 overlapping the leading end to form a seam 138, Swain, col. 8, lines 32-38.

Further, Swain's written description from col. 9, line 38 to col. 10, line 1 describes an ultrasonic welding station 3 comprising an ultrasonic horn 136. The seam 138 of overlapping ends of thermoplastic web 6 is supported by mandrel 80 and held in place below the path of ultrasonic horn 136 by suction from parallel rows of ports 90, 91 and 92, col. 9, lines 38-45. The ultrasonic horn 136 traverses the seam 138, col. 9, lines 65-68; col. 10, line 1, thereby welding the seam 138, from col. 11, line 13 to col. 12, line 2. See also Swain, col. 22, lines 3-32.

Also, the aforementioned U.S. Pat. No. 5,085,719 to Eck describes at col. 5, lines 15-22 a web lap joint 24 formed by the overlapping segment ends of thermoplastic web 12 that is supported by the upper surface of anvil 14 and held in place below the path of ultrasonic horn and transducer assembly 30 by suction from parallel rows of grooves 33, 34, 36 and 38 in the upper surface of anvil 14, the grooves leading to vacuum plenums within the interior of the anvil 14.

Further to Eck, col. 6, lines 1-16 describe applying vacuum to grooves 33, 34, 36 and 38 to hold the overlapping opposite edges 20 and 22 of web 12 in place during ultrasonic welding. As described, the length of grooves 33, 34, 36 and 38 is normally slightly shorter than the width of web 12. Any suitable vacuum aperture, such as grooves or holes, may be utilized. See also the "example" described from col. 13, line 30 to col. 14, line 30.

A new polymeric material named "Kapton®" has been developed jointly by DuPont® and Xerox® Corporation for intermediate transfer belts. Note that the registered trademark "DuPont" is owned by E. I. du Pont de Nemours and Company, Wilmington, Del.

It has been discovered that the same Kapton® material works nicely for fuser belts. These fuser belts are ultrasonically welded, then super-finished to disguise the welded seam area. The foregoing super-finishing may be accomplished by any convenient super-finishing process. See, for example, the super-finishing processes described in the aforementioned U.S. Pat. No. 6,848,978 B2 to Mastro.

One problem in fabricating the fuser belts with the Kapton® material, however, is that fuser belts are very small in circumference. The current fuser belts used in one application are only 30 milli-meters ("mm") in diameter or 3.70 inches in circumference. In contrast, conventional belt fabrication processes are only capable of making belts as small as 18.00 inches in circumference.

Due to the beam strength of the Kapton® material, its bend radius is such that the material will not lay flat when wrapped around a 30 mm diameter mandrel with a 0.25 inch-wide weld flat ground for ultrasonically joining the overlapped material. As depicted in the present FIG. 1, one problem is that the material tends to tent up, as depicted by reference number 2 in the present FIG. 1, and there is no way to get vacuum apertures 6 in close enough to the overlap area to hold the material down. This tenting is due to the beam strength of the material 20 to be welded relative to the radius of curvature of the belt.

Thus, there is a need for the present invention.

SUMMARY

One embodiment is a method comprising providing a sheet of thermoplastic belt material having a first end with a first radius of curvature, providing a mandrel having a second radius of curvature that is no more than about 12% larger or smaller than the first radius of curvature, wrapping the sheet of thermoplastic belt material on the mandrel to form a material overlap region, and welding the material overlap region to form a seamed belt. The first radius of curvature can be imparted to the first end by at least one of annealing, calendering and tentering. In certain embodiments, the mandrel has a flat welding surface. In other embodiments, the mandrel has a curved welding surface. Often, the entire sheet of belt material has a radius of curvature corresponding to the first radius of curvature. In some cases, the first radius of curvature is imparted to the first end by heating the belt material and cooling the belt material on a roller before wrapping. Usually, the roller has a third radius of curvature that is smaller than the first radius of curvature. The ratio of the first radius of curvature to the third radius of curvature is often about 2-4 and usually is about 3-3.5.

In some cases, the sheet of belt material is a portion of a material supply having a length and a width, and a tension is applied to the material supply during welding to form a material supply tensioned portion, the tension causing the material supply tensioned portion to concurrently sever from the seam as the seam is formed. The material often is secured on the mandrel using one or more vacuum apertures. In some cases, the seam is welded using an ultrasonic welding horn. The seam usually is formed in a direction that is substantially parallel to the mandrel axial. The mandrel often has a circumference of about 3.7 inches. The ultrasonic welding horn often has a tip with a diameter of about 0.05 inches.

In some embodiments, the seam is super-finished to form a finished belt. The belt often is a fuser belt. The belt material typically has a tensile modulus of elasticity of at least 300 kpsi. In some cases, the thermoplastic belt material is a polyimide.

Another embodiment is a method comprising providing a material supply comprising a length of material having a first radius of curvature and having a width; providing a mandrel having a radius of curvature similar to that of the material supply; securing and wrapping the material on the mandrel to form a material overlap region; applying a tension to the material supply to form a material supply tensioned portion; and welding the material overlap region to form a seam traversing the width, the seam as formed concurrently severing itself from the material supply tensioned portion.

A further embodiment is a fuser belt material comprising a rolled film of a thermoplastic polyimide having a tensile modulus of elasticity of at least 300 kpsi, the rolled film having a radius of curvature of about 0.5 to 0.7 inches, a thickness of about 0.003 inches-0.005 inches and a width of about 12-13 inches.

Yet another embodiment is a belt comprising a belt comprising a thermoplastic film having a tensile modulus of elasticity of at least 300 kpsi and an anisotropic gradient from an inner face to an outer face, the belt having a length of no more than about 4 inches and having a welded seam. The belt typically has a thickness of about the belt of claim 23, having a thickness of about 0.003-0.005 inches. The thermoplastic film often comprises a polyimide. In some cases, the thermoplastic film further comprises a polyaniline. Often, the belt is a fuser belt, which may be super-finished.

DETAILED DESCRIPTION

Figure 1:
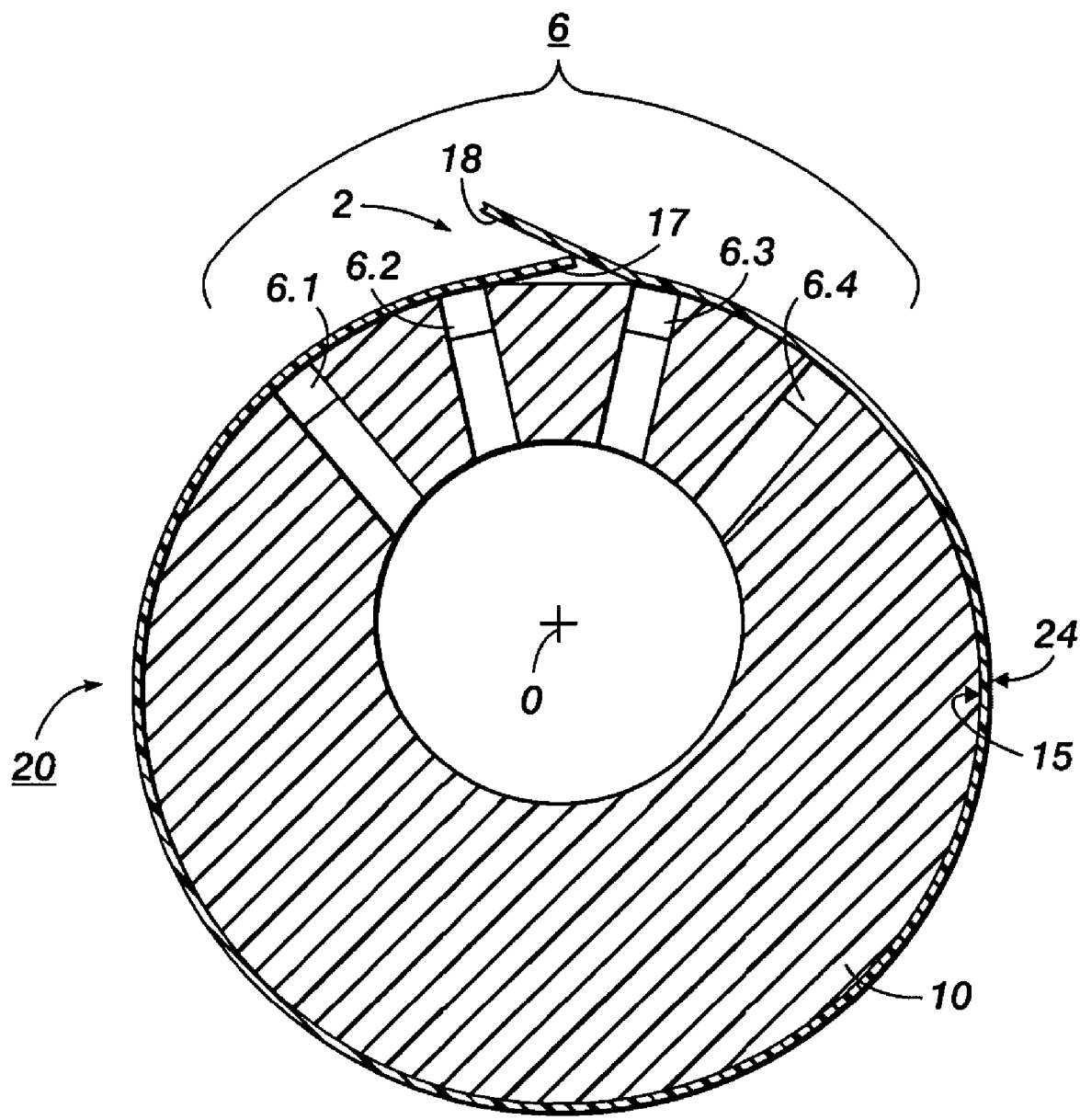
FIG. 1 is a cutaway profile attached view of a material 20 disposed on a mandrel 10. As shown, the mandrel 10 includes a mandrel axial 0 and a mandrel outer periphery 15.

Commercially available fuser belts, which typically have a small diameter of about 0.98-1.57 inches (25-40 mm) and usually about 1.18 inches (30 mm), are generally spun cast or otherwise formed as seamless belts. Ultrasonic welding processes that are used for making longer welded belts have not effectively been used to make small diameter belts. The embodiments disclosed herein overcome the problems that previously had been encountered in efforts to make small diameter welded belts.

Briefly, in one embodiment, belt material is wrapped around a small diameter mandrel. Instead of cutting the belt to length, the material is then continued to be wrapped around the mandrel, forming a belt material overlap, and held under tension. An ultrasonic welding horn is then traversed across the width of the belt overlap. As this horn is traversed across the overlapped joint, the horn not only joins the belt material wrapped around the mandrel but, as the trailing edge is held under tension, the horn also separates or severs the trailing edge of the material from the welded seam.

In another embodiment, belt material is pre-treated to induce a curl in at least one end, and usually in at least both ends, of the material to facilitate a vacuum hold down for welding. The pre-treatment often involves heat treatment of the belt material followed by cooling while the material is wrapped around a roller that has a smaller diameter than the mandrel to be used for welding. Heat treated belt material having a curl fixed therein is wrapped around a small diameter mandrel and is then seamed by welding or the like. The induced curvature facilitates welding by eliminating the tenting problem that otherwise would occur due to the high beam strength of the belt material. The belt material can be cut to the appropriate size before welding, or the welding horn can be used in conjunction with a tensioning force to separate the trailing edge of the material from the seam during welding.

As used herein, a "mandrel" is a support surface for joining two ends of a belt. A "seamed belt" refers to a belt that is formed by joining two ends by welding or another suitable connecting technique. "Radius of curvature" refers to the radius of the circle of curvature along a portion of a curve. "Curl" refers to the physical property of not laying flat when in an untensioned state. As used herein, an "anisotropic gradient" is a difference in properties at different points through the thickness of a film or sheet of a material that cause curl in the film or sheet. A "material overlap region" is the section of a belt in which the two opposite ends of belt material overlap before and during welding. A "welding surface" is the portion of a mandrel or other support structure upon which two or more parts are welded together. As used herein, "glass transition temperature" is defined as the temperature at which a thermoplastic material is transformed from a glassy or solid state to a viscous liquid state during heating or from a viscous liquid state to a glassy or solid state during cooling. "Tensile modulus of elasticity" is defined in accordance with ASTM-D882-02.

Referring now to FIG. 1 there is shown a cutaway profile attached view of a material 20 disposed on a mandrel 10.

As shown, the material 20 includes a material outer surface 24, a first end 17 and a second end 18. Tenting due to the beam strength of the material 20 is depicted by reference number 2.

Still referring to FIG. 1, the mandrel 10 comprises a mandrel axial 0, an outer periphery 15, a first vacuum aperture 6.1, a second vacuum aperture 6.2, a third vacuum aperture 6.3 and a fourth vacuum aperture 6.4. The first, second, third and fourth vacuum apertures respectively designated 6.1, 6.2, 6.3 and 6.4 are collectively depicted by reference number 6.

Figure 2:
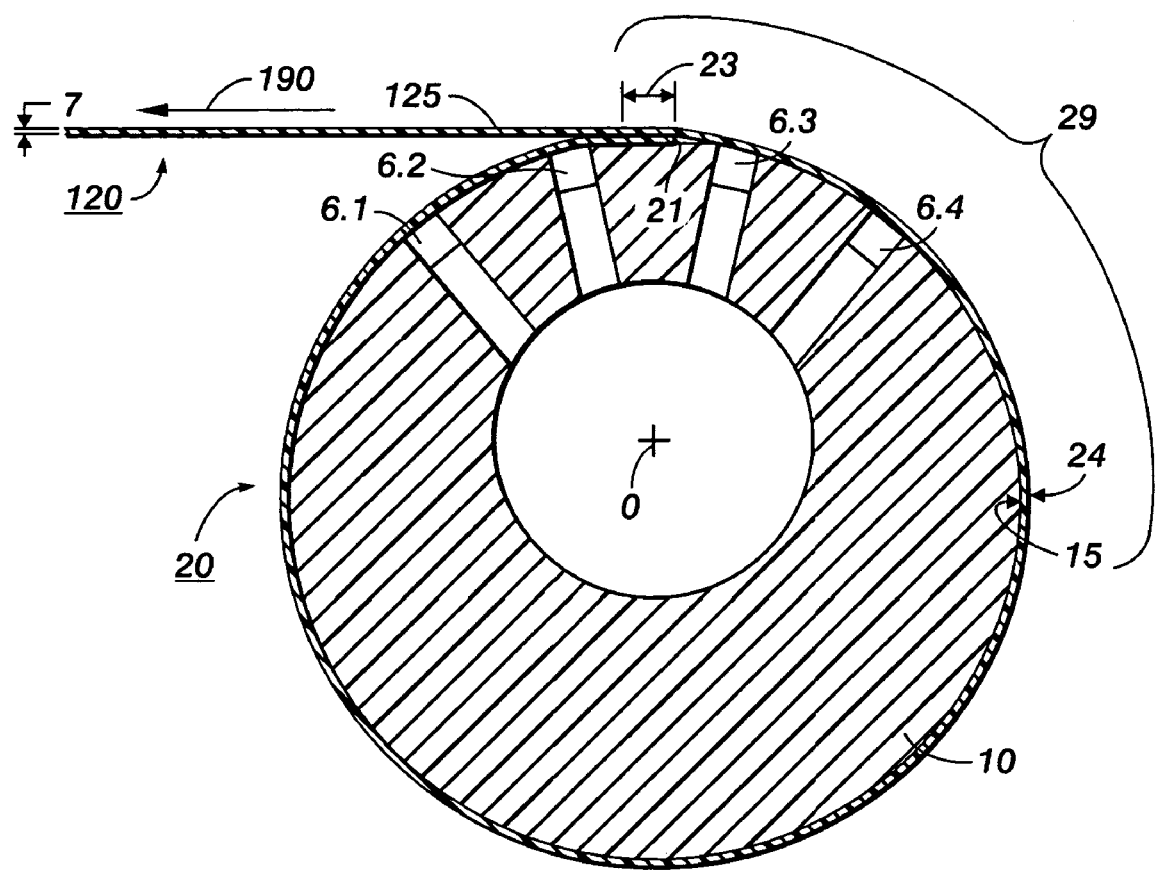
FIG. 2 is a cutaway profile attached view of a material supply 120 arranged to feed a length of material 20 to the mandrel 10 of FIG. 1.

Referring now to FIG. 2, there is shown a cutaway profile attached view of a material supply 120 arranged to feed a length of material 20 to the FIG. 1 mandrel 10.

As shown, the material 20 includes a material end 21 disposed on the mandrel outer periphery 15, with the material 20 being wrapped in a counter-clockwise direction on the mandrel outer periphery 15. The portion of the material 20 that is wrapped on the mandrel 10, or the mandrel-wrapped material portion, is depicted by reference number 29. As shown, the mandrel-wrapped material portion 29 includes a material overlap region 23. The mandrel-wrapped material portion 29 is held in place on the mandrel outer periphery 15 by means of the included mandrel vacuum apertures 6.1, 6.2, 6.3 and 6.4.

As shown, a tension force 190 is applied to the material supply 120. The resulting material tensioned or taut portion 125 thus is urged by the tension 190 to move or pull away from the material overlap 23 in the direction of the corresponding reference arrow 190.

Figure 3:
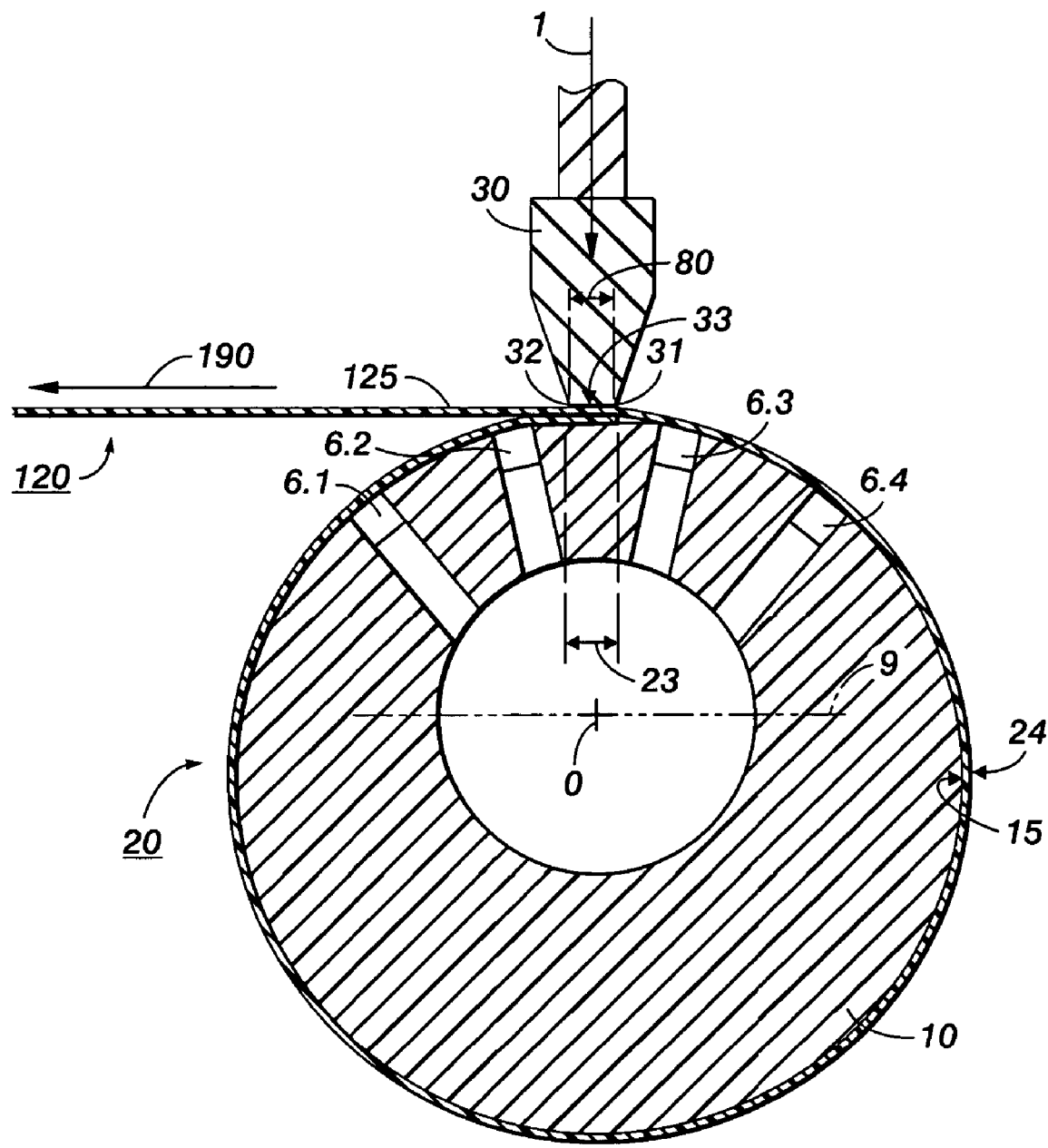
FIG. 3 is a further cutaway profile attached view of the FIG. 2 arrangement of the material 20 wrapped in a counter-clockwise direction upon the mandrel outer periphery 15, thus forming a mandrel-wrapped material portion 29. An included ultrasonic welding horn 30 is arranged to weld a seam 80 in an overlap portion 23 of the material 20 that is wrapped on the mandrel 10. Also shown is a reference arrow 1 positioned above the welding horn 30 and pointed downwards towards the seam 80 and the mandrel axial 0. A reference line 9 intersecting the mandrel axial 0 and orthogonal to the arrow 1 is included.

Referring now to FIG. 3, there is shown a further cutaway profile attached view of the FIG. 2 arrangement of the material 29 wrapped upon the mandrel outer periphery 15. Also shown is an included ultrasonic welding horn 30 having a first horn edge 31, a second horn edge 32 and a horn tip 33. As shown, the ultrasonic welding horn 30 is arranged and positioned to weld a portion of the material overlap region 23, thus forming a seam 80 in the material 20.

As shown, a reference arrow 1 is positioned above the welding horn 30 and pointed downwards towards the material seam 80 and the mandrel axial 0.

Still referring to FIG. 3, there is shown a reference line 9 intersecting the mandrel axial 0 and orthogonal to the arrow 1.

Figure 4:
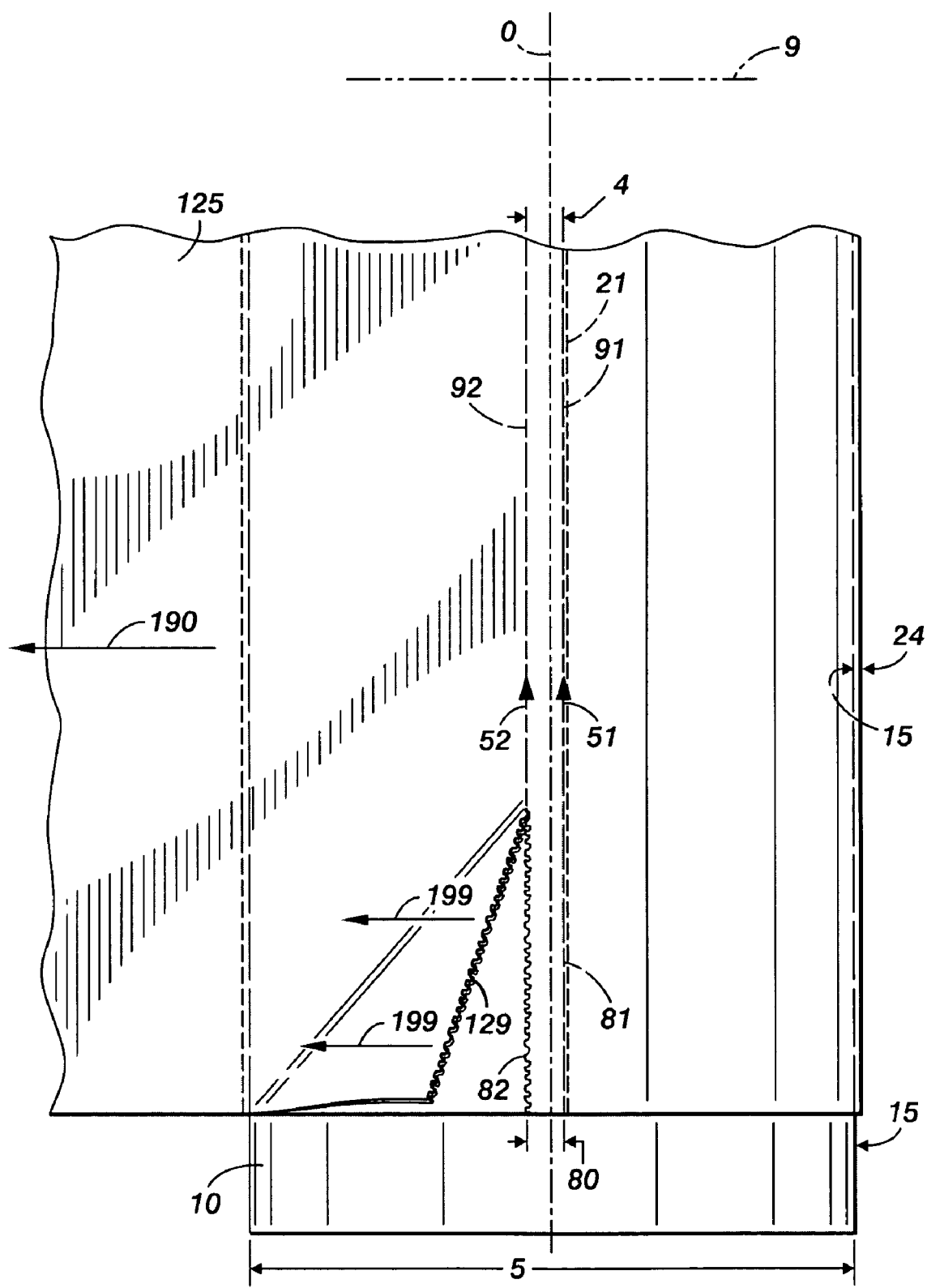
FIG. 4 is a top-down birds-eye detached view of the belt welding arrangement of FIG. 3 from the viewing position of the reference arrow 1. As shown, the reference line 9 intersects the mandrel axial 0.

Referring now to FIG. 4, there is shown a top-down birds-eye detached view of the FIG. 3 belt welding arrangement from the position of the reference arrow 1. As shown, the reference line 9 intersects the mandrel axial 0. The mandrel 10 comprises an outer diameter 5. As shown, the material seam 80 is oriented substantially parallel to the mandrel axial 0.

As shown, the belt seam 80 is bounded by a seam first periphery 91 and a substantially parallel seam second periphery 92. The two belt seam peripheries 91 and 92, in turn, are oriented generally parallel to the mandrel axial 0. The spacing between seam 80 first and second peripheries 91 and 92 is based on the spacing between the ultrasonic horn first and second edges 31 and 32.

Still referring to FIG. 4, the welding motion of the ultrasonic horn first edge 31 along the corresponding seam first periphery 91 is depicted by a first arrow 51. Similarly, the welding motion of the ultrasonic horn second edge 32 along the corresponding seam second periphery 92 is depicted by a second arrow 52.

As shown, as the ultrasonic welding horn 30 moves in a direction generally parallel along the mandrel axial 0, the belt material 20 between the welding horn edges 31 and 32 is welded together to form the belt seam 80.

Referring still to FIG. 4, the welded seam edge that is formed by the ultrasonic welding horn first edge 31 is depicted by reference number 81.

Likewise, the welded seam edge that is formed by the ultrasonic welding horn second edge 32 is depicted by reference number 82.

As shown in FIG. 4, as the material 20 along the seam second periphery 92 is welded to form the welded seam edge 82, the material supply tension force 190 concurrently causes the material supply tensioned portion 125 to become separated or severed from the welded seam edge 82. This concurrent severing of the material supply tensioned portion 125 from the welded seam edge 82 is depicted by reference number 199. The concurrently-severed edge of the material supply tensioned portion 125 is depicted by reference number 129.

As shown in FIG. 4, the resulting welded seam 80 is substantially or generally parallel to the mandrel axial 0.

To summarize, in FIG. 4 the seam 80 results from welding the first seam edge 81 while concurrently-severing-and-welding the second seam edge 82. After the foregoing process is complete, the resulting belt seam 80 is finished by means of a super-finishing process. The resulting finished belt 200 is discussed in connection with FIG. 5 below.

Figure 5:
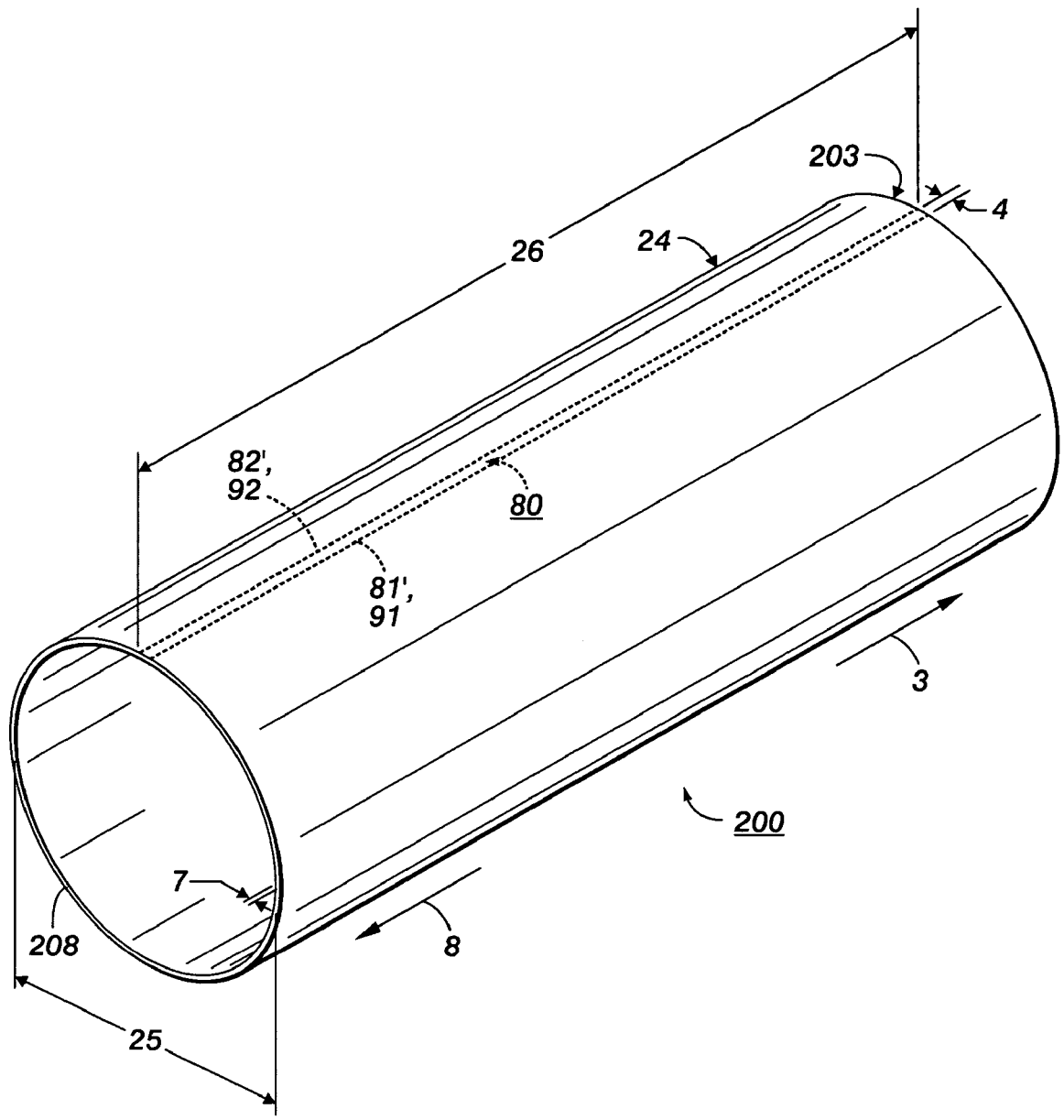
FIG. 5 is an elevated perspective detached profile view of a finished belt 200. An inboard direction is depicted by reference number 3, and the opposite outboard direction is depicted by reference number 8.

Referring now to FIG. 5, there is shown an elevated perspective detached profile view of the finished belt 200. An inboard direction is depicted by reference number 3, and the opposite outboard direction is depicted by reference number 8. As shown, the belt 200 comprises a belt inboard end 83, a belt outboard end 28, with a belt material width 26 therebetween. Further, the belt 20 comprises an inner diameter 25 that is substantially equal to the mandrel outer diameter 5. Also, the finished belt 200 comprises a belt material thickness 7 and a belt material outer surface 24.

As shown, the finished belt 200 comprises the seam 80 of FIG. 4. As discussed in connection with FIG. 4 above, the seam 80 is generally bounded by the seam first periphery 91 and the seam second periphery 92.

Still referring to FIG. 5, the depicted belt 200 finished seam edge along the first periphery 91 is depicted by reference number 81'. It will be understood that the finished seam edge 81' in the present FIG. 5 corresponds to the finished version of the welded seam edge 81 that is discussed in connection with FIG. 4 above.

Referring still to FIG. 5, the depicted belt 200 finished seam edge along the second periphery 92 is depicted by reference number 82'. It will be understood that the finished seam edge 82' in the present FIG. 5 corresponds to the finished version of the welded-and-concurrently-severed seam edge 82 that is discussed in connection with FIG. 4 above.

Moreover, one embodiment comprises an initial step of holding the leading edge of the belt material with standard vacuum apertures coupled to an included vacuum source. Any suitable vacuum source may be used for this purpose. For good understanding, the vacuum source itself is not shown in the drawing.

The belt material is then wrapped around a small diameter mandrel. Instead of cutting the belt to length, the material is then continued to be wrapped around the mandrel, forming a very large overlap, and held under tension. This forms a relatively large overlap of material, but holds the material down conforming to the mandrel's geometry.

An ultrasonic welding horn is then traversed across the width of the belt overlap. In one embodiment, a "Branson" 2000 LP, 40 KHz, 300 Watt ultrasonic welding system is used. This product is supplied by Branson Ultrasonics Corporation, 41 Eagle Road, Danbury, Conn. 06813, phone 203-796-0400. This ultrasonic horn profile has only a 1.2 mm diameter horn tip, which welds just a 1.2 mm wide area under the very wide overlapped joint. As this horn is traversed across the overlapped joint, the horn not only joins the belt material wrapped around the mandrel but, as the trailing edge is held under tension, the horn also separates or severs the trailing edge of the material from the welded seam.

Thus, as a result of the aforementioned process, there is now provided a joined small diameter fuser belt. Because the ultrasonically separated or severed trailing edge of the material is ragged and rough, it must be cut off, thus exposing a clean flat edge ready for the next wrapping cycle.

The newly-formed belt, still wrapped around its mandrel, is then "super-finished" to smooth and flatten the seamed area. After finishing, the vacuum source is turned off, and the finished belt is removed from the mandrel. In one embodiment, compressed air is pumped through the vacuum apertures to assist with the belt removal process.

In summary, there is shown in FIGS. 1-5 a method of fabrication for small diameter belts. This method comprises holding the belt material in tension with a large overlap and then ultrasonically welding and slitting in a single step. This operation is followed by a super-finishing operation to smooth the weld line.

In certain embodiments, the material comprises any thermoplastic thin film. In some embodiments, the material is a thermoplastic thin film having a curve formed along at least part of its length.

Another embodiment, shown in FIGS. 6-9, includes the pre-treatment of belt material to induce curl in the lengthwise direction. The belt material is bent into an arc having an imaginary axis across the width of the web in order that the arc is visible when viewing a cross section taken longitudinally along the sheet material. The bend usually involves each longitudinal end of material for a particular belt, or, as may often be more convenient, can encompass the entire length of the sheet material.

The radius of curvature of the belt material should be similar to the radius of curvature of the mandrel upon which welding of the seam is to take place. Depending upon the technique used to induce curvature, it sometimes is necessary to initially impart a smaller radius of curvature to the material, as some degree of straightening may take place after cooling and/or after removal from a roller. For example, when one type of specially formulated, filled KAPTON® KJ polyimide material having a tensile modulus of elasticity of 400 kpsi is used to make a fuser belt having a diameter of 30 mm (1.18 inches), the diameter of the roller used to heat treat and cool the sheet material should be 15-25 mm (0.59-0.98 inches), and usually is 18-22 mm (0.71-0.87 inches) with a target of 20 mm (0.79 inches). Although a circular arc is preferred, the shape of the arc may be an ellipse, parabola, etc. as long as the radius of curvature at the ends of the belt material is small enough that the ends lie flat or nearly flat when wrapped around a mandrel. A higher stiffness material will be less likely to lie flat than a lower stiffness material.

Figure 6:
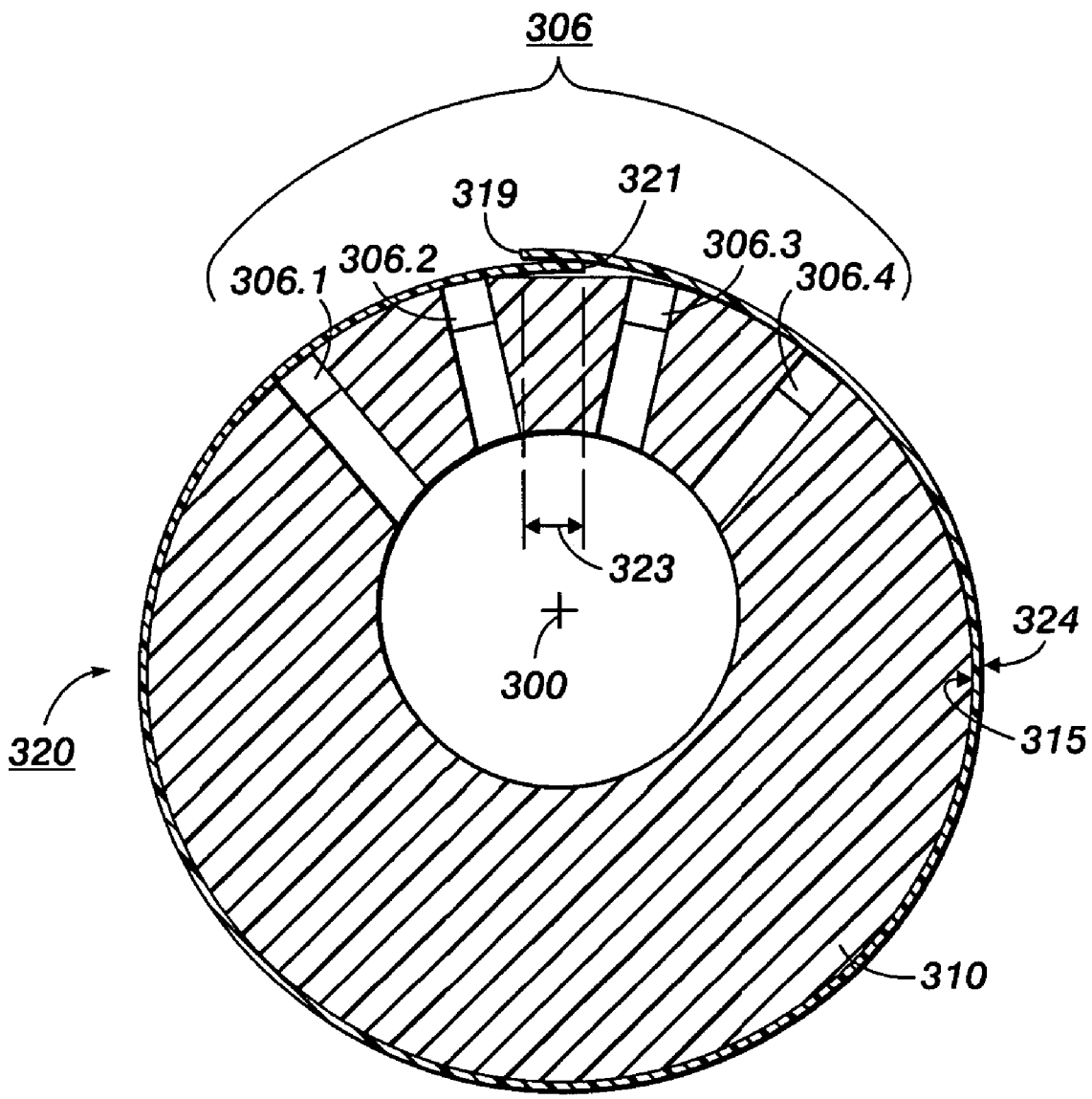
FIG. 6 is a cutaway profile attached view of a material 310 disposed on a mandrel 320.

As shown in FIG. 6, the belt material 320 includes a material outer surface 324, a first end 321 and a second end 319 that overlaps the first end 321, forming a material overlap region 323. The material is cut to an appropriate length before or during wrapping. A mandrel 310 comprises a mandrel axial 300, an outer periphery 315, a first vacuum aperture 306.1, a second vacuum aperture 306.2, a third vacuum aperture 306.3 and a fourth vacuum aperture 306.4. The first, second, third and fourth vacuum apertures respectively designated 306.1, 306.2, 306.3 and 306.4 are collectively depicted by reference number 306. The material 320 is held in place on the mandrel outer periphery 315 when a vacuum pressure is applied through the vacuum apertures 306. The first end 321 of the material 320 lies generally flat against the mandrel 310 because of the curl that previously was induced in the material 320. The overlapping second end 319 lies nearly flat over the first end 321. There is no tenting when high stiffness belt material is used as a result of the curl imparted to the belt material prior to wrapping.

Figure 7:
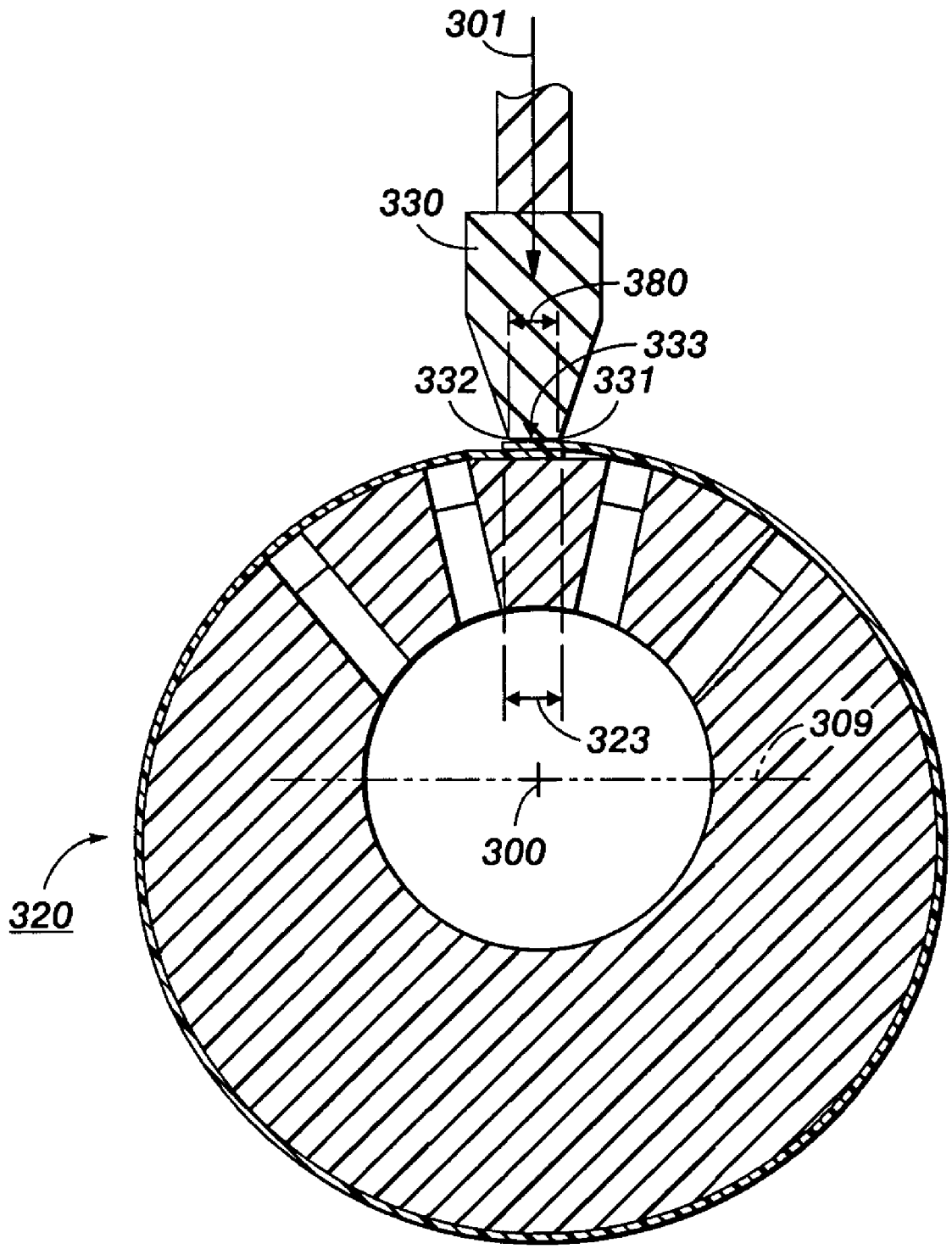
FIG. 7 is a cutaway profile attached view showing ultrasonic welding of a seam.

Referring now to FIG. 7, an ultrasonic welding horn 330 is shown having a first horn edge 331, a second horn edge 332 and a horn tip 333. The ultrasonic welding horn 330 is arranged and positioned to weld at least a portion of the material overlap region 323, thus forming a welded seam 380 in the material 320. The seam usually is oriented substantially parallel to the mandrel axial 300. A reference arrow 301 is positioned above the welding horn 330 and pointed downwards towards the material seam 380 and the mandrel axial 300. There is shown a reference line 309 intersecting the mandrel axial 300 and orthogonal to the arrow 301. The ultrasonic welding horn 330 moves in a direction generally parallel to the mandrel axial 100 in order to weld the belt material 320 together to form an endless seamed flexible belt 390 having a belt seam 380. After welding, the belt seam 380 is finished by means of a super-finishing process.

Figure 8:
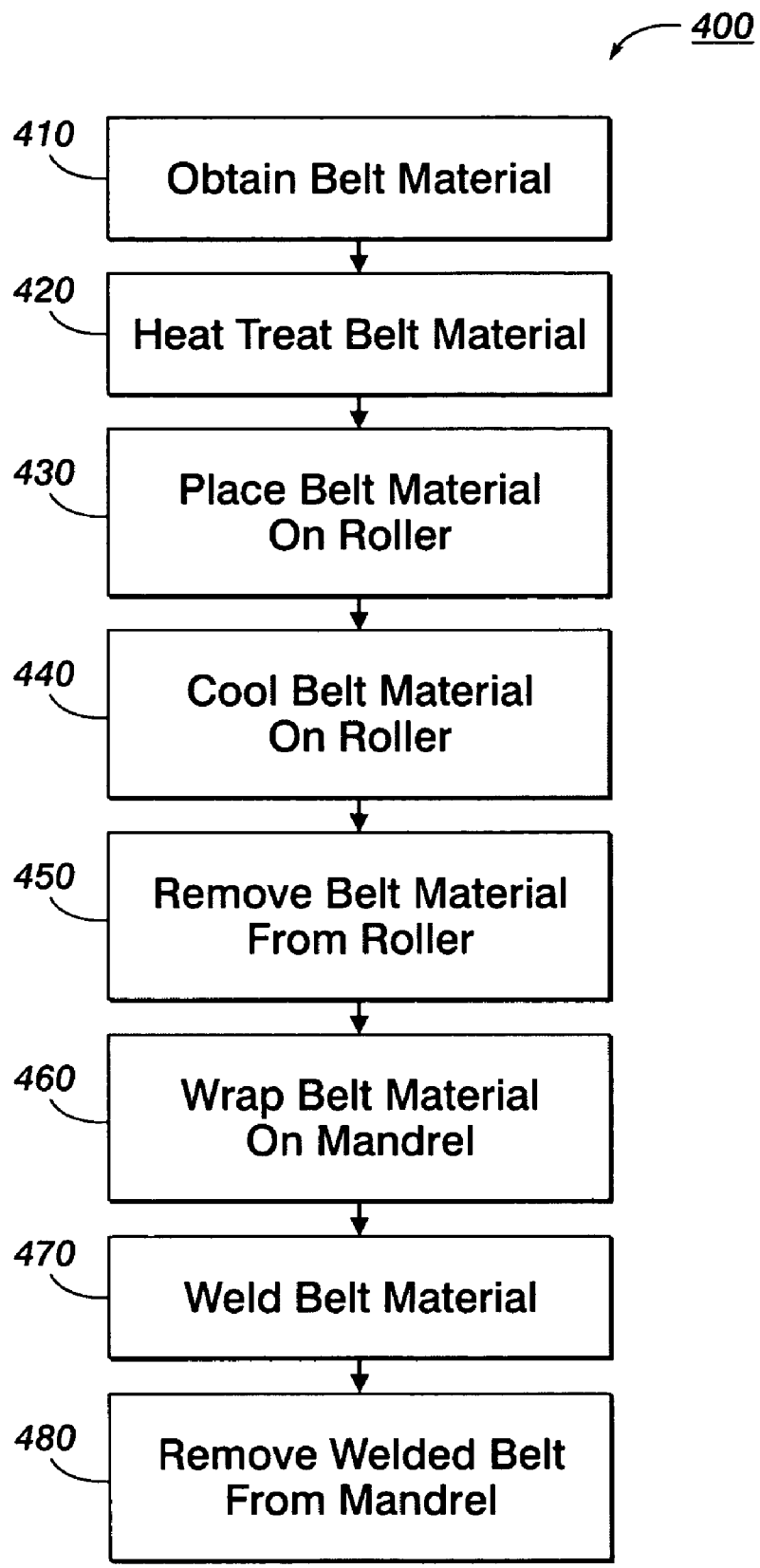
FIG. 8 is a flow chart showing a method according to one embodiment in which the belt material is heat treated prior to welding.

FIG. 8 summarizes a method in which the belt material can be heat treated prior to wrapping and welding. The overall process is designated as 400. The belt material is obtained at 410, heat treated at 420 by heating it up at least to its glass transition temperature, and placed on a roller at 430. The material can be placed on the roller before or after heating. The heated and rolled belt material is cooled at 440 while on the roller in order that it conforms to and generally keeps the actuate shape of the roller. Cooling can be rapid, as by quenching, or slow, using ambient conditions. The curved and cooled belt material is removed from the roller at 450 and subsequently wrapped on a mandrel at 460. The wrapped belt material is welded at 470 and the welded belt is removed from the mandrel at 480.

Figure 9:
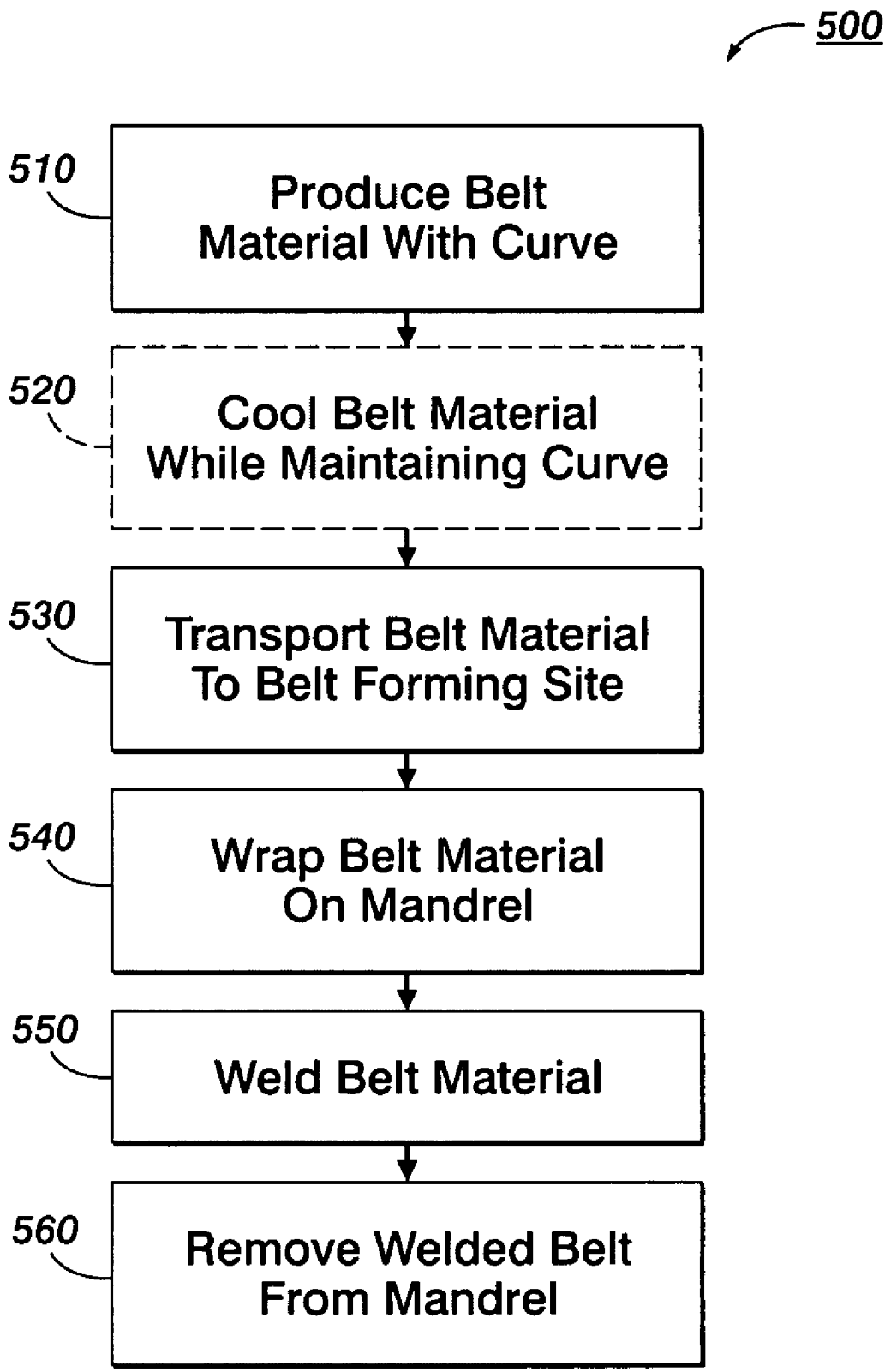
FIG. 9 is a flow chart showing another method in which the belt material is heat treated prior to welding.

FIG. 9 summarizes a method in which the manufacturer imparts the curvature of the belt material as part of the manufacturing process. The overall process is designated as 500. The belt material is produced at 510 and as part of the production process the material is wrapped on a roller or otherwise shaped to have an arcuate shape, or is molecularly oriented in a manner that will result in some degree of curl upon cooling. Non-limiting examples of techniques for orientation of thermoplastic polymeric materials are provided in U.S. Pat. Nos. 3,988,399 and 4,120,931, the contents of which are incorporated herein by reference. If necessary, the material is cooled at 520 to maintain or result in a curved shape. Next, the material is transported at 530 to the belt forming site, at which it is wrapped on a mandrel at 540 and welded at 550. The welded belt is removed from the mandrel at 560.

Figure 10:
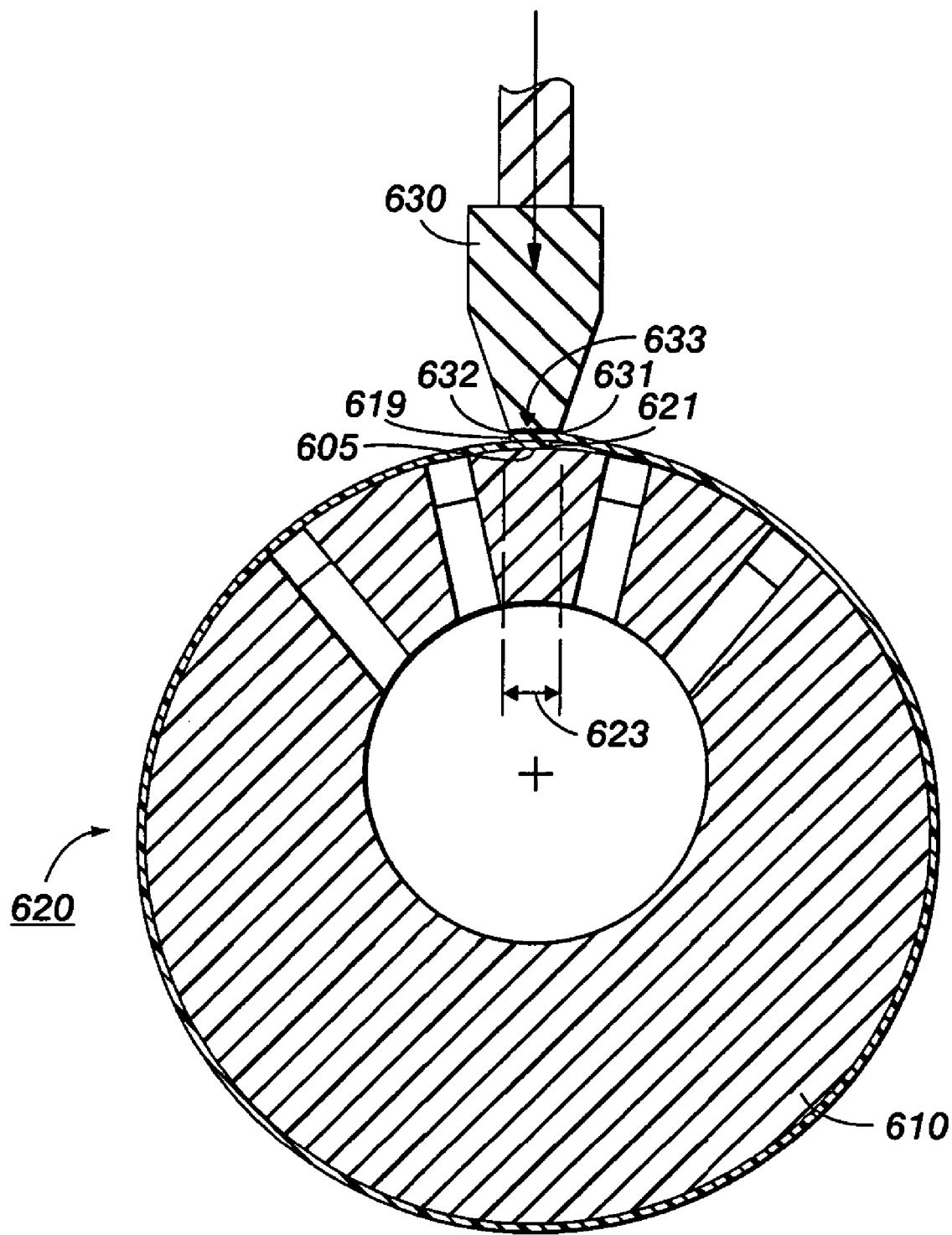
FIG. 10 is a cutaway profile attached view showing ultrasonic welding of a belt seam using a curved welding surface.

FIG. 10 shows an embodiment in which a mandrel having a curved welding region is used to weld belt material 620. The belt material has a first end 621 and an overlapping second end 619. The welding region 605 on the mandrel 610 has the same radius of curvature as the rest of the mandrel 610. The welding tip 633 of ultrasonic welding horn 630 is inwardly curved between its first and second edges 631 and 632 in a radius of curvature generally corresponding to the radius of curvature of the mandrel 610. This configuration can be used to provide the seamed belt with a uniform shape after welding. After super-finishing, it may be even more difficult to locate the seamed region than with the embodiment shown in FIG. 7 because of the uniformity of the curvature around the entire perimeter of the belt.

Suitable thermoplastics for use in making the fuser belts include thermoplastic materials that are able to withstand high temperatures. Non-stick materials are particularly useful. Non-limiting examples of suitable thermoplastic materials include polyimides and other materials that are disclosed in U.S. patent application Publication No. 2006/0002746 A1. The polyimides can be filled with polyaniline and/or other fillers. The belt may be welded as a single layer or may include multiple layers. In some cases, additional layers are added to the belt after welding.

Typical dimensions for the belts at the time of welding are a thickness of 0.003 inches-0.005 inches, a length of 29-31 mm (1.14-1.22 inches) after the extra belt material has been severed, and a width of about 12 inches. After welding, the belts can be coated to impart other desired charateristics.

When ultrasonic welding is used to form the fuser belts, the ends of the belt typically are overlapped by about 1.1 mm. The amount of energy applied in welding is sufficient to raise the material temperature in the weld zone to or above the glass transition temperature of the belt material.

Specific illustrative embodiments are exemplified below. The embodiments are not limited to the materials, conditions or process parameters disclosed in the Examples.

EXAMPLE 1

Four 8½ by 11 inch sheets of a specially formulated KAPTON® KJ having a thickness of 4 mils were obtained. The material was a filled polyimide having a tensile modulus of elasticity of 400 kpsi and a glass transition temperature of 590 Deg. F. Each sheet was wrapped around an aluminum rod having a diameter of 0.375 inches (a radius of 0.1875 inches) and the trailing edge was taped. The sheets were separately placed in an oven for five minutes and then quenched in ice water for 1 minute. After cooling, the sheets were removed from the rods and their radius of curvature was measured. The oven temperature for each sample was different. The four oven temperature settings were 500 Deg. F., 550 Deg. F., 600 Deg. F. and 650 Deg. F. It was believed that each sheet reached the oven temperature during the heating process. The sheets that were heated to 500 Deg. F. and 550 Deg. F. did not have any induced curl as a result of the heat treatment followed by cooling. The sheets that were heated to 600 Deg. F. and 650 Deg. F. each had a radius of curvature of 0.625 inches after cooling and removal, which is about 3.3 times larger than the radius of the roll.

PROPHETIC EXAMPLE 2

A seamed fuser belt is prepared using a rectangular cut sheet of the same KAPTON® KJ material as was used in Example 1. The polyimide sheet is heated to 600 Deg. F. and placed on a cylindrical roller having a diameter of 20 mm (0.78 inches) for cooling. After it is cooled, the sheet is removed from the roller. Upon removal, the material rolls itself back up to a hollow, cylindrical configuration having a radius of curvature of 15 mm (0.59 inches). A 12 inch (30.5 cm) by 31.1 mm rectangular portion of the sheet is cut and wrapped lengthwise around a 30 mm (1.18 inch) diameter mandrel. The ends overlap about 1.1 mm. The belt is ultrasonically welded, using a frequency of 40 khz into a seamed flexible polyimide belt. There is no tenting problem in the process due to the curvature that is imparted to each end of the belt material. The belt is tested and is found to have a seam strength of greater than 30 pounds per inch using a tensile strength test. The tensile strength must be equal to or greater than 23 pounds per inch in order to prevent failure of a fuser belt.

PROPHETIC EXAMPLE 3

A seamed fuser belt is prepared using an elongated rectangular sheet of 0.004 inch thick thermoplastic polyimide having a glass transition temperature of 590 Deg F. and a tensile modulus of elasticity of 400 kpsi. The sheet has been shaped during the manufacturing process to produce a lengthwise curl in the cooled sheet material with a radius of curvature of 15 mm (0.59 inches). The sheet is wrapped lengthwise around a 30 mm diameter mandrel having an outwardly curving welding region to produce an overlap region of about 1.1 mm. The belt is ultrasonically welded, using a welding horn with an inwardly curving weld tip at a frequency of 40 khz, into a seamed flexible polyimide belt. The outer end of the sheet material is tensioned during welding and the combination of tensioning and heat cause the tensioned supply portion to sever from the seam as the seam is formed. The belt is tested and is found to have a seam strength of greater than 30 pounds per inch using a tensile strength test.

Thus, there is described the first aspect, namely, a concurrent welding and severing belt forming method, the method comprising providing a material supply 120 comprising a length of material 20, the material having a width 26; providing a mandrel 10; securing and wrapping the material 20 on the mandrel 10 to form a material overlap region 23; applying a tension 190 to the material supply 120 to form a material supply tensioned portion 125; and welding 30, 31, 32, 33 the material overlap region 23 to form a seam 80 traversing the width 26, the tension 190 causing the material supply tensioned portion 125 to concurrently sever 199 from the seam 80 as the seam 80 is formed.

The following nine (9) sentences labeled A through I apply to the foregoing first aspect of certain embodiments disclosed herein:

A. In one embodiment, the material 20 is secured on the mandrel 10 by means of one or more included vacuum apertures 6.

B. In one embodiment, the seam 80 is welded by means of an ultrasonic welding horn 30.

C. In one embodiment, the mandrel 10 comprises an outer periphery 15 that is substantially circular-shaped.

D. In one embodiment, the mandrel 10 comprises a mandrel axial 0 and the seam 80 is formed in a direction 51, 52 that is substantially parallel to the mandrel axial 0.

E. In one embodiment, the mandrel 10 comprises an outer diameter 5 of about 30 milli-meters ("mm").

F. In one embodiment, the ultrasonic welding horn 30 comprises a welding horn tip 33 with a diameter of about 1.2 mm.

G. In one embodiment, the material 20 comprises a thermoplastic film.

H. In one embodiment, the method includes a step of super-finishing the seam 80 to form a finished belt 200.

I. In one embodiment, the finished belt 200 comprises a fuser belt.

Also, there is described the second aspect, namely, a method of forming a belt 200, comprising wrapping a belt material 20 supply 120 around the outer periphery 15 of a mandrel 10, the belt material 20 continued to be wrapped around the mandrel to form a belt material overlap region 23, the belt material supply 120 being held under a tension 190 thus forming a belt material supply tensioned portion 125, an ultrasonic welding horn 30 traversing 51, 52 across the width 26 of the belt material overlap region 23 to weld the belt material 20 therein thus forming a welded seam 80, the trailing edge 129 of the belt material supply tensioned portion 125 being held under the tension 190 while the welded seam 80 is formed so that the ultrasonic welding horn 30 concurrently severs the belt material supply tensioned portion 125 trailing edge 129 from the welded seam 80.

The following eight (8) sentences labeled J through Q apply to the foregoing second aspect of the embodiments disclosed herein:

J. In one embodiment, the belt material 20 is secured on the mandrel 10 by means of one or more included vacuum apertures 6.

K. In one embodiment, the mandrel 10 comprises an outer periphery 15 that is generally circular-shaped.

L. In one embodiment, the mandrel 10 comprises a mandrel axial 0 and the seam 80 is formed in a direction 51, 52 that is generally parallel to the mandrel axial 0.

M. In one embodiment, the mandrel 10 comprises an outer diameter of about 30 milli-meters ("mm").

N. In one embodiment, the ultrasonic welding horn 30 comprises a welding horn tip 33 with a diameter of about 1.2 mm.

O. In one embodiment, the belt material 20 comprises a thermoplastic film.

P. In one embodiment, the method includes a step of superfinishing the seam 80.

Q. In one embodiment, the belt 200 comprises a fuser belt.

Also, there is described the third aspect, namely, a concurrent welding and severing belt forming method, the method comprising providing a material supply 120 comprising a length of material 20, the material having a width 26; providing a mandrel 10; securing and wrapping the material 20 on the mandrel 10 to form a material overlap region 23; applying a tension 190 to the material supply 120 to form a material supply tensioned portion 125; welding 30, 31, 32, 33 the material overlap region 23 to form a seam 80 traversing the width 26, the seam 80 as formed concurrently severing itself 199 from the material supply tensioned portion.

The following nine (9) sentences labeled R through Z apply to the foregoing third aspect of the embodiments disclosed herein:

R. In one embodiment, the material 20 is secured on the mandrel 10 by means of one or more included vacuum apertures 6.

S. In one embodiment, the seam 80 is welded by means of an ultrasonic welding horn 30.

T. In one embodiment, the mandrel 10 comprises an outer periphery 15 that is substantially circular-shaped.

U. In one embodiment, the mandrel 10 comprises a mandrel axial 0 and the seam 80 is formed in a direction 51, 52 that is substantially parallel to the mandrel axial 0.

V. In one embodiment, the mandrel 10 comprises an outer diameter 5 of about 30 milli-meters ("mm").

W. In one embodiment, the ultrasonic welding horn 30 comprises a welding horn tip 33 with a diameter of about 1.2 mm.

X. In one embodiment, the material 20 comprises a thermoplastic film.

Y. In one embodiment, the method includes a step of superfinishing the seam 80 to form a finished belt 200.

Z. In one embodiment, the finished belt 200 comprises a fuser belt.

The table below lists the drawing element reference numbers together with their corresponding written description:

| Ref. No.: | Description: |
|---|---|
| 0, 300 | mandrel axial |
| 1 | reference arrow pointing towards the seam 80 and the mandrel axial 0 |
| 301 | reference arrow |
| 2 | tenting |
| 3 | inboard direction |
| 4 | seam width |
| 5 | mandrel outer diameter |
| 605 | welding region |
| 6, 306 | vacuum apertures |
| 6.1, 306.1 | first vacuum aperture |
| 6.2, 306.2 | second vacuum aperture |
| 6.3, 306.3 | third vacuum aperture |
| 6.4, 306.4 | fourth vacuum aperture |
| 7 | material thickness |
| 8 | outboard direction |
| 9, 309 | reference line intersecting mandrel axial 0 and orthogonal to the reference arrow 1 |
| 10, 310, 610 | mandrel |
| 15, 315 | mandrel outer periphery |
| 17 | material first end |
| 18 | material second end |
| 319, 619 | material second end |
| 20, 320, 620 | material |
| 21, 321, 621 | material end |
| 23, 323, 623 | material overlap region |
| 24, 324 | material outer surface |
| 25 | finished belt inner diameter |
| 26 | material width, also finished belt width |
| 29 | material portion wrapped on mandrel, or mandrel-wrapped material portion |
| 30, 330, 630 | ultrasonic welding horn |
| 31, 331, 631 | ultrasonic welding horn first edge |
| 32, 332, 632 | ultrasonic welding horn second edge |
| 33, 333, 633 | ultrasonic welding horn tip |
| 51 | ultrasonic welding horn first edge seam welding motion direction |
| 52 | ultrasonic welding horn second edge seam welding motion direction |
| 80 | welded material, or welded seam |
| 81 | welded seam edge |
| 81' | finished version of the welded seam edge 81 |
| 82 | concurrently-severed-and-welded seam edge |
| 82' | finished version of the concurrently-severed-and-welded seam edge 82 |
| 91 | seam first periphery |
| 92 | seam second periphery |
| 120 | material supply |
| 125 | material supply tensioned portion |
| 129 | material supply concurrently-severed edge, also material supply trailing edge |
| 190 | tension force |
| 199 | concurrent severing of the material supply tensioned portion 125 from the welded seam edge 82 |
| 200 | finished belt |
| 203 | finished belt inboard end |
| 208 | finished belt outboard end |

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
providing a sheet of thermoplastic belt material having a first end with a first radius of curvature imparted by at least one of annealing, calendering and tentering, providing a mandrel having a second radius of curvature that is no more than about 12% larger or smaller than the first radius of curvature, wrapping the sheet of thermoplastic belt material on the mandrel to form a material overlap region, and welding the material overlap region to form a seamed belt.

2. The method of claim 1, wherein the first radius of curvature is imparted to the first end by heating the belt material and cooling the belt material on a roller before wrapping.

3. The method of claim 2, wherein the roller has a third radius of curvature that is smaller than the first radius of curvature.

4. The method of claim 3, wherein the ratio of the first radius of curvature to the third radius of curvature is about 2-4.

5. The method of claim 1, wherein the mandrel has a flat welding surface.

6. The method of claim 1, wherein the mandrel has a curved welding surface.

7. The method of claim 1, wherein the entire sheet of belt material has a radius of curvature corresponding to the first radius of curvature.

8. The method of claim 1, wherein the sheet of belt material is a portion of a material supply having a length and a width, and a tension is applied to the material supply during welding to form a material supply tensioned portion, the tension causing the material supply tensioned portion to concurrently sever from the seam as the seam is formed.

9. The method of claim 1, the material being secured on the mandrel using one or more vacuum apertures.

10. The method of claim 1, the seam being welded using an ultrasonic welding horn.

11. The method of claim 1, wherein the mandrel comprises a mandrel axial and the seam is formed in a direction that is substantially parallel to the mandrel axial.

12. The method of claim 1, the mandrel having a circumference of about 3.7 inches.

13. The method of claim 10, the ultrasonic welding horn comprising a welding horn tip with a diameter of about 0.05 inches.

14. The method of claim 1, further comprising super-finishing the seam to form a finished belt.

15. The method of claim 1, wherein the finished belt comprises a fuser belt.

16. The method of claim 1, wherein the thermoplastic belt material has a tensile modulus of elasticity of at least 300 kpsi.

17. The method of claim 1, wherein the thermoplastic belt material is a polyimide.

18. A method comprising providing a material supply having a width and a length, the material supply having a treatment-induced curl that imparts to the material supply a first radius of curvature; providing a mandrel having a radius of curvature similar to that of the material supply; securing and wrapping a portion of the provided material supply on the mandrel to form a material overlap region; applying a tension to the material supply to form a material supply tensioned portion; and welding the material overlap region to form a seam traversing the width, the seam as formed concurrently severing itself from the material supply tensioned portion.

19. The method of claim 18, wherein the mandrel has a flat welding surface.

20. The method of claim 18, wherein the mandrel has a curved welding surface.

21. The method of claim 18, wherein the thermoplastic belt material comprises a polyimide.

22. The method of claim 17, wherein the thermoplastic belt material comprises a polyaniline.

23. The method of claim 1, wherein the seamed belt obtained by welding has a tensile modulus of elasticity of at least 300 kpsi.

24. The method of claim 1, wherein the seamed belt obtained by welding has a seam strength of greater than 23 pounds per inch as measured using a tensile strength test.

25. The method of claim 1, wherein the seamed belt obtained by welding has a seam strength of greater than 30 pounds per inch as measured using a tensile strength test.

26. The method of claim 1, wherein the seamed belt obtained by welding has a thickness of about 0.003-0.005 inches.

27. The method of claim 1, wherein the seamed belt obtained by welding has a width of about 12-13 inches.

28. The method of claim 26, wherein the seamed belt obtained by welding has a width of about 12-13 inches.

* * * * *